(12) United States Patent
Cheng et al.

(10) Patent No.: US 12,497,500 B2
(45) Date of Patent: Dec. 16, 2025

(54) FOOD GRADE STARCH BASED MODELING CLAY WITH HIGH ELASTICITY AND HIGH DUCTILITY AND ITS PREPARATION METHOD

(71) Applicant: Jiangnan University, Wuxi (CN)

(72) Inventors: Li Cheng, Wuxi (CN); Ruixuan Li, Wuxi (CN); Yue Wang, Wuxi (CN); Yi Wang, Wuxi (CN); Mengwei Zhang, Wuxi (CN); Zhengbiao Gu, Wuxi (CN); Yan Hong, Wuxi (CN); Zhaofeng Li, Wuxi (CN); Caiming Li, Wuxi (CN); Xiaofeng Ban, Wuxi (CN); Binkun Li, Wuxi (CN); Qi Liu, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 19/182,774

(22) Filed: Apr. 18, 2025

(65) Prior Publication Data
US 2025/0243348 A1 Jul. 31, 2025

Related U.S. Application Data

(63) Continuation of application No. PCT/CN2024/100019, filed on Jun. 19, 2024.

(30) Foreign Application Priority Data

Jun. 20, 2023 (CN) .......................... 202310731527.0

(51) Int. Cl.
*C08L 3/02* (2006.01)
*A63H 33/00* (2006.01)
*B29C 67/24* (2006.01)
*B29L 31/52* (2006.01)

(52) U.S. Cl.
CPC .............. *C08L 3/02* (2013.01); *A63H 33/001* (2013.01); *B29C 67/24* (2013.01); *B29K 2003/00* (2013.01); *B29L 2031/5209* (2013.01)

(58) Field of Classification Search
CPC ....................................................... C08L 3/00
See application file for complete search history.

(56) References Cited

U.S. PATENT DOCUMENTS

| | | | | |
|---|---|---|---|---|
| 5,873,933 A | * | 2/1999 | Mackey | C08L 1/284 106/205.1 |
| 5,972,092 A | * | 10/1999 | Cordova | A63H 33/001 106/133.1 |
| 5,990,205 A | * | 11/1999 | Cordova | C08L 29/04 524/400 |
| 6,359,057 B1 | * | 3/2002 | Li | C08K 3/38 524/557 |
| 2010/0083870 A1 | * | 4/2010 | Spreuwers | B44C 3/04 106/215.3 |
| 2011/0146534 A1 | * | 6/2011 | Uang | C08K 3/346 106/206.1 |
| 2015/0007747 A1 | * | 1/2015 | Doane, Jr. | C08K 7/22 106/206.1 |
| 2022/0025184 A1 | * | 1/2022 | Osnato | C08K 3/16 |

FOREIGN PATENT DOCUMENTS

| | | | |
|---|---|---|---|
| BR | 102019019791 A2 | 12/2019 | |
| CN | 104436695 A | 3/2015 | |
| CN | 104629649 A | 5/2015 | |
| CN | 105504360 A | 4/2016 | |
| CN | 111196895 A | 5/2020 | |
| CN | 114479200 A | 5/2022 | |
| JP | H0411276 A | 1/1992 | |
| JP | 2005272766 A | * | 10/2005 |
| KR | 102178104 B1 | 11/2020 | |
| WO | WO-2023100170 A1 | * | 6/2023 ................ C08L 3/04 |

OTHER PUBLICATIONS

Ecolink (What is 90 White Oil, https://ecolink.com/info/what-is-90-white-oil/?srsltid=AfmBOoqnZvQXHHwzMocq23Y-99MHFSDZ0MvN1U9iQie3Sg9h4Q1TjVGS, 2020) (Year: 2020).*
Machine Translation of JP 2005272766 A, 2025 (Year: 2025).*

* cited by examiner

*Primary Examiner* — Liam J Heincer
(74) *Attorney, Agent, or Firm* — IPro, PLLC; Na Xu

(57) ABSTRACT

Disclosed are a food grade starch based modeling clay with high elasticity and high ductility and its preparation method, belonging to the technical field of modeling clay preparation. The starch based modeling clay provided by the present disclosure is prepared from the following formula components: 160-180 parts of starch, 140-160 parts of water, 10-15 parts of a food grade stabilizer, 10-15 parts of edible salt, 0-10 parts of hydrophilic colloid, 0.6-0.8 parts of a preservative, 40-60 parts of a food grade plasticizer, 6-10 parts of food grade white oil, and 4-8 parts of edible pigment. The starch includes one or a combination of more of cassava starch, wheat starch, and glutinous rice starch. The present disclosure, through combined use of the starch and the hydrophilic colloid, makes the prepared starch based modeling clay have good viscoelasticity and ductility, and good in storage stability, safe and non-toxic.

2 Claims, No Drawings

FOOD GRADE STARCH BASED MODELING CLAY WITH HIGH ELASTICITY AND HIGH DUCTILITY AND ITS PREPARATION METHOD

TECHNICAL FIELD

The present disclosure relates to a food grade starch based modeling clay with high elasticity and high ductility and its preparation method, belonging to the technical field of modeling clay.

BACKGROUND

Modeling clay is a type of educational toy for children to create creative models. Its preparation process and material selection are superior to those of plasticine, and it is soft, delicate, and smooth in texture and does not shed debris. When a modeling clay product dries, adding an appropriate amount of water can restore its softness. The modeling clay has environmental protection functions and thus is suitable for making creative works. Moreover, different edible pigments can be added to prepare modeling clay of different colors. By kneading modeling clay of different colors, richly colored modeling clay can be created, which greatly helps the hand-eye-brain combination and thinking creativity of children.

At present, there are many kinds of modeling clay on the market, but the main raw materials of the modeling clay are rubber, PVC, ore mud powder, flour and the like, and the auxiliary materials thereof are mostly toxic chemical products, such as gelling agents, adhesives, industrial salts and industrial white oils. The base materials of these modeling clay often contain migratable elements and heavy metals, which may pose a danger to children due to accidental ingestion as their toys. Furthermore, the modeling clay on the market is smelly, and some of the modeling clay have high hardness and poor tensile performance, easily stick to hands and shed debris, are greasy, lack viscosity, and cannot be well bonded to other models.

In the prior art, it is disclosed the use of better rice and flour instead of rubber, PVC, and the like to prepare modeling clay, which can reduce the impact of toxic substances. For example, Chinese patent CN114479200A discloses a food grade rice modeling clay and its preparation method; Chinese Patent CN114196223S discloses a modeling clay and its preparation method; however, the modeling clay prepared from rice flour and starch has insufficient elasticity and ductility; and the modeling clay is prone to cracking after air-dried, and its storage stability is also poor.

Therefore, it is necessary to develop a food grade starch based modeling clay with high elasticity and high ductility, which is safe and non-toxic, and has good adhesive properties and excellent performance.

SUMMARY

In view of the defects and deficiencies in the prior art, the present disclosure provides a food grade starch based modeling clay with high elasticity and high ductility and its preparation method, which can effectively solve the problems of insufficient elasticity and ductility, as well as poor storage stability of the modeling clay in the prior art.

Starch has the advantages of easy availability of raw materials, environmental friendliness, low cost, non-toxicity and harmlessness, biodegradability, and the like. In addition, starch itself has good adhesive property, high viscosity, and high elasticity. The present disclosure uses starch as a raw material and improves the viscoelasticity of modeling clay by controlling starch gelatinization degree during a preparation process. The addition of hydrophilic colloid in the modeling clay can enable hydrogen bonding with starch to form a stable three-dimensional mesh gel network structure, so that starch particles are evenly dispersed into the network structure, enhancing the cohesive force and bonding force of the modeling clay, and improving the elasticity and ductility of the modeling clay. The addition of a food grade plasticizer can break the hydrogen bonds between starch molecules, thereby reducing the glass transition temperature of starch and enhancing the tensile property of starch. According to the present disclosure, a large number of explorations are conducted on the control of three key steps of raw materials, reaction temperature and gelatinization degree, so that the viscosity can be maximized and the reaction can be controlled during the reaction process without gelation. Therefore, the preparation process is more complete, the plasticity, temperature resistance and storage stability of the prepared modeling clay meet the requirements of the industry standards of Modeling Clay, and the elasticity and ductility of the prepared modeling clay are far higher than those of commercially available modeling clay.

The first object of the present disclosure is to provide a food grade starch based modeling clay with high elasticity and high ductility. formula components of the food grade starch based modeling clay is the following in parts by mass:

| | |
|---|---|
| Starch | 160-180 parts |
| Water | 140-160 parts |
| Food grade stabilizer | 10-15 parts |
| Edible salt | 10-15 parts |
| Preservative | 0.6-0.8 parts |
| Hydrophilic colloid | 0-10 parts |
| Food grade plasticizer | 40-60 parts |
| Food grade white oil | 6-10 parts |
| Edible pigment | 4-8 parts | the starch includes one or a combination of more of cassava starch, wheat starch, and glutinous rice starch.

In one embodiment, the food grade stabilizer includes one or a combination of more of food grade potassium dihydrogen phosphate, food grade magnesium chloride, and food grade calcium chloride.

In one embodiment, the food grade plasticizer includes one or a combination of more of food grade glycerin, food grade sorbitol, and food grade propylene glycol. The plasticizer enhances the thermoplasticity of the starch, and improves the softness, plasticity and tensile strength of the modeling clay.

In one embodiment, the hydrophilic colloid includes one or a combination of more of gellan gum, xanthan gum, sodium carboxymethyl cellulose, guar gum, gelatin, hydroxypropyl carboxymethyl cellulose, and microcrystalline cellulose. The food grade hydrophilic colloid has functions of increasing the internal bonding force of the modeling clay and enhancing the viscoelastic property of the modeling clay.

In one embodiment, the food grade preservative includes one or a combination of more of sodium benzoate, ethylparaben and its salts, sodium dehydroacetate, and potassium sorbate. The food grade preservative has a function of preventing the growth of microorganisms.

In one embodiment, the food grade white oil is produced and developed specifically for the food processing industry, pharmaceutical industry, and agricultural product processing industry. For example, refined oil mainly extracted from petroleum is enabled to have excellent oxidation stability and photostability by being processed through special production processes, such as a unique HT high-pressure hydrocracking process. The main components of food grade white oil include mineral oil, vegetable oil, animal oil, and the like, which are refined to remove impurities and harmful substances therein, thus ensuring the safety and stability of the food grade white oil. The food grade white oil meets the following FDA standards: Articles 172.878, 178.3620 (a), 178.3570, and 176.170 of FDA 21 CFR, and has passed level H1 and 3H certifications by NSF.

In one embodiment, the food grade white oil includes one or a combination of more of food grade white oils of models 1 #, 3 #, 5 #, 7 #, 10 #, 15 #, 26 #, 32 #, 36 #, and 70 #. The food grade white oil has functions of providing lubrication and achieving water retention.

In one embodiment, the edible pigment includes one or a combination of more of azure blue lake, lemon yellow pigment, sunset yellow pigment, quinoline yellow pigment, azorubine pigment, amaranth pigment, carmine pigment, erythrosine pigment, allura red pigment, brilliant blue pigment, azure blue pigment, vegetable carbon black, and titanium dioxide. The function of pigments is to give color to the modeling clay.

In one embodiment, formula components of the food grade starch based modeling clay is the following in parts by mass:

| | |
|---|---|
| Starch | 160 parts |
| Water | 140 parts |
| Food grade stabilizer | 10 parts |
| Edible salt | 10 parts |
| Preservative | 0.6 parts |
| Hydrophilic colloid | 6 parts |
| Food grade plasticizer | 40 parts |
| Food grade white oil | 8 parts |
| Edible pigment | 5 parts | the starch includes one or a combination of more of cassava starch, wheat starch, and glutinous rice starch.

The second object of the present disclosure is to provide a preparation method of the food grade starch based modeling clay with high elasticity and high ductility. The method includes the following steps:
(1) adding solid raw materials comprising the starch, the food grade stabilizer, the edible salt, and the preservative into a kneading mixer for mixing the raw materials evenly, so as to form a mixture;
(2) preparing the hydrophilic colloid and water into a hydrophilic colloid solution, and specifically, stirring the hydrophilic colloid and the water well with a disintegrator to form a colloid solution;
(3) adding the colloid solution obtained in step (2) and water into the kneading mixer, turning on the kneading mixer for heating and pre-gelatinization for 15-25 minutes at a temperature of 55-65° C., so as to form a dough-like structured clay ball;
(4) adding the food grade plasticizer to the dough-like structured clay ball prepared in step (3), and stirring well to form a clay ball with plasticity; then, adding the food grade white oil, stirring continuously and kneading evenly to form a shaped clay ball; and
(5) preparing the food grade pigment and water into a pigment solution, then adding same to the shaped clay ball prepared in step (4), stirring well, pouring a product out and allowing the product to stand at room temperature, and then packaging after cooling.

In one embodiment, in step (1), the kneading mixer mixes the raw materials at a rate of 20-40 rpm.

In one embodiment, the mass concentration of the hydrophilic colloid solution in step (2) is 5-10%.

In one embodiment, in step (3), the temperature at which pre-gelatinization is carried out is raised to 55-65° C. at a rate of 2-5° C./minute.

In one embodiment, the stirring speed in step (4) is 20-40 rpm.

In one embodiment, the mass concentration of the pigment solution in step (5) is 2-10%.

Beneficial Effects of the Present Disclosure:
(1) In the preparation of the food grade starch based modeling clay provided by the present disclosure, starch is selected as a raw material. Under a heat treatment process, the starch is gelatinized to a certain extent by controlling the gelatinization temperature of the starch. Part of the starch is used for bonding various components, and the other part thereof is used as a filler to enhance the hardness of the modeling clay and improve the viscoelasticity of the modeling clay. It also includes the pretreatment of hydrophilic colloid, which is to prepare a colloid solution with a certain concentration, and enable the colloid to fully react with the starch that is gelatinized to a certain extent to form a three-dimensional network structure, which further improves the stability and viscoelasticity of the modeling clay. The prepared modeling clay is good in viscoelasticity, high in elastic property, and excellent in ductility, so that the problems in the prior art that finished products of modeling clay are easy to harden and crack, and poor in elasticity and ductility are effectively solved.
(2) Compared with the traditional method of mixing hot water with a flour raw material, the present disclosure adopts mixing cold water with starch while conducting heating treatment, which can make the starch linked to the colloid solution more tightly. Due to addition of cold water, on the one hand, the process is simplified, and on the other hand, starch gelatinization is allowed to be more uniform, resulting in better viscoelasticity after the starch forms into a ball, and a more stable network structure of modeling clay.
(3) The properties of the food grade starch based modeling clay in the present disclosure meet the requirements of QB/T 2960-2008 type modeling clay, with cracking property ranging from 0.4 to 1.0, cold resistance at (−15±3)° C./4 h, and plasticity not exceeding 20%. Moreover, compared with commercially available modeling clay, the elasticity and ductility of the starch based modeling clay measured by a texture analyzer are far beyond the performance of the commercially available modeling clay, which greatly improves the product performance of the modeling clay.

DETAILED DESCRIPTION

The present disclosure will be further described below through specific examples. However, these examples are merely exemplary and do not constitute any limitation on the scope of protection of the present disclosure. In the following examples and comparative examples, the reagents, materials, and instruments used are commercially available unless otherwise specified.

Determination Methods Involved in the Present Disclosure:

1. Elasticity Determination Method

The texture characteristics of modeling clay were analyzed by simulating two chewing actions using a texture analyzer equipped with a P/36 r cylindrical probe. Test conditions: The speed before test was 2 mm/s, the test speed was 1 mm/s, the speed after test was 1 mm/s, the strain was 60%, and the trigger force was 5.0 g. The following parameters were obtained: hardness (g), elasticity, cohesive force and resilience.

2. Determination of Ductility of Starch Based Modeling Clay

Starch based modeling clay was spread, laid flat and fixed on a sample test bench, an HDP/TPB test probe was set to descend at a speed of 1 mm/s and press down on the modeling clay at a constant speed until the modeling clay was pierced, the instantaneous Distance value at the moment when the modeling clay broke was measured, and each sample was tested repeatedly 3 times.

Example 1

Provided is a preparation method of a food grade starch based modeling clay with high elasticity and high ductility. The food grade starch based modeling clay is prepared from the following formula components:

| Component | Mass/g |
| --- | --- |
| Cassava starch | 160 |
| Water | 140 |
| Food grade potassium dihydrogen phosphate (stabilizer) | 10 |
| Iodine-free edible salt | 10 |
| Sodium benzoate | 0.6 |
| Guar gum (hydrophilic colloid) | 6 |
| Glycerin (plasticizer) | 40 |
| Food grade white oil: 3# | 8 |
| Pigment titanium dioxide | 5 |

The method includes the following steps:

(1) solid raw materials including 160 g of cassava starch, 10 g of potassium dihydrogen phosphate, 10 g of iodine-free edible salt and 0.6 g of sodium benzoate preservative were added into a kneading mixer, and the kneading mixer was adjusted to mix the raw materials evenly at a rate of 40 rpm;

(2) 6 g of guar gum and 60 g of water were prepared into a hydrophilic colloid solution, and the mixture prepared in step (1) was stirred with the hydrophilic colloid solution for 2 min using a disintegrator, so that the colloid and water were enabled to form a uniform colloid solution;

(3) the colloid solution obtained in step (2) and 30 g of an aqueous solution were added into the kneading mixer, the kneading mixer was turned on for heating to make the temperature raised to 65° C. at a rate of 3° C./min, and pre-gelatinization was carried out for 15 min to allow starch to be gelatinized and polymerized, so that a dough-like structuredd clay ball was formed;

(4) 40 g of glycerin was added to the dough-like structuredd clay ball prepared in step (3), and the mixture was continuously stirred for 10 min at a rate of 40 rpm, so as to form a plastic clay ball;

(5) 8 g of food grade white oil: 3 #was added to the plastic clay ball obtained in step (4), and the mixture was continuously stirred for 10 min for kneading evenly, so as to form a shaped clay ball; and (6) 5 g of titanium dioxide and 50 g of water were prepared into a pigment solution, then the obtained pigment solution was added to the shaped clay ball prepared in step (5) and stirred for 10 min, the stirred modeling clay was poured out and allows to stand at room temperature, and then the product was packaged after cooled.

The modeling clay prepared in Example 1 was tested according to the industry standards QB/T 2960-2008 of *Modeling Clay*. The test results are shown in Table 1-1 below.

TABLE 1-1

| | Test results of starch based modeling clay | |
| --- | --- | --- |
| Test item | Technical requirement | Test result |
| Appearance | Smooth surface, uniform color, without obvious impurities | Smooth surface, uniform color, without obvious impurities |
| Cracking property | A sample has no obvious cracks after being folded in half | A sample has no obvious cracks after being folded in half |
| Plasticity | 0.4-1.0 | 0.49-0.52, qualified |
| Density (g/cm³) | 0.25-1.8 | 1.12-1.18, qualified |
| Cold resistance (−15 ± 3)° C./4 h | After a cold resistance test, the sample returns to room temperature, and the change in its plasticity does not exceed 20% | 0.52-0.54, qualified |
| Packaging tightness | Weight loss ≤ 1% | 0.12%-0.16%, qualified |
| Mildew resistance | At (30 ± 3)° C. and relative humidity 75%, there is no mildew after 72 h of experiment | No mildew after 72 h, qualified |

The elasticity and ductility of the starch based modeling clay prepared in Example 1 were tested according to commercially available standards. The test results are shown in Table 1-2 below.

TABLE 1-2

Test results of elasticity and ductility of starch based modeling clay

| Test item | Test result | |
|---|---|---|
| | Commercially available modeling clay | Starch based modeling clay |
| Elasticity | 0.168 | 0.291 |
| Ductility (mm) | 15.75 | 21.20 |

Example 2

The only difference from Example 1 was that the guar gum in the formula of the food grade starch based modeling clay was replaced with xanthan gum, and the other parameters and preparation methods were the same as those in Example 1.

The modeling clay prepared in Example 2 was tested according to the industry standards QB/T 2960-2008 of *Modeling Clay*. The test results are shown in Table 2-1 below.

TABLE 2-1

Test results of starch based modeling clay

| Test item | Technical requirement | Test result |
|---|---|---|
| Appearance | Smooth surface, uniform color, without obvious impurities | Smooth surface, uniform color, without obvious impurities |
| Cracking property | A sample has no obvious cracks after being folded in half | A sample has no obvious cracks after being folded in half |
| Plasticity | 0.4-1.0 | 0.53-0.56, qualified |
| Density (g/cm$^3$) | 0.25-1.8 | 1.14-1.17, qualified |
| Cold resistance (−15 ± 3)° C./4 h | After a cold resistance test, the sample returns to room temperature, and the change in its plasticity does not exceed 20% | 0.51-0.55, qualified |
| Packaging tightness | Weight loss ≤ 1% | 0.13%-0.16%, qualified |
| Mildew resistance | At (30 ± 3)° C. and relative humidity 75%, there is no mildew after 72 h of experiment | No mildew after 72 h, qualified |

The elasticity and ductility of the starch based modeling clay prepared in Example 2 were tested according to commercially available standards. The test results are shown in Table 2-2 below.

TABLE 2-2

Test results of elasticity and ductility of starch based modeling clay

| Test item | Test result | |
|---|---|---|
| | Commercially available modeling clay | Starch based modeling clay |
| Elasticity | 0.168 | 0.264 |
| Ductility (mm) | 15.75 | 19.92 |

Example 3

The only difference from Example 1 was that the glycerin in the formula of the food grade starch based modeling clay was replaced with sorbitol, and the other parameters and preparation methods were the same as those in Example 1.

The modeling clay prepared in Example 3 was tested according to the industry standards QB/T 2960-2008 of *Modeling Clay*. The test results are shown in Table 3-1 below.

TABLE 3-1

Test results of starch based modeling clay

| Test item | Technical requirement | Test result |
|---|---|---|
| Appearance | Smooth surface, uniform color, without obvious impurities | Smooth surface, uniform color, without obvious impurities |
| Cracking property | A sample has no obvious cracks after being folded in half | A sample has no obvious cracks after being folded in half |
| Plasticity | 0.4-1.0 | 0.50-0.54, qualified |
| Density (g/cm$^3$) | 0.25-1.8 | 1.12-1.14, qualified |

TABLE 3-1-continued

| Test results of starch based modeling clay | | |
|---|---|---|
| Test item | Technical requirement | Test result |
| Cold resistance (−15 ± 3)° C./4 h | After a cold resistance test, the sample returns to room temperature, and the change in its plasticity does not exceed 20% | 0.51-0.56, qualified |
| Packaging tightness | Weight loss ≤ 1% | 0.12%-0.15%, qualified |
| Mildew resistance | At (30 ± 3)° C. and relative humidity 75%, there is no mildew after 72 h of experiment | No mildew after 72 h, qualified |

The elasticity and ductility of the starch based modeling clay prepared in Example 3 were tested according to commercially available standards. The test results are shown in Table 3-2 below.

TABLE 3-2

| | Test results of elasticity and ductility of starch based modeling clay | |
|---|---|---|
| | Test result | |
| Test item | Commercially available modeling clay | Starch based modeling clay |
| Elasticity | 0.168 | 0.251 |
| Ductility (mm) | 15.75 | 18.92 |

Example 4

The only difference from Example 1 was that the cassava starch in the formula of the food grade starch based modeling clay was replaced with wheat starch, and the other parameters and preparation methods were the same as those in Example 1.

The modeling clay prepared in Example 4 was tested according to the industry standards QB/T 2960-2008 of *Modeling Clay*. The test results are shown in Table 4-1 below.

TABLE 4-1

| Test results of starch based modeling clay | | |
|---|---|---|
| Test item | Technical requirement | Test result |
| Appearance | Smooth surface, uniform color, without obvious impurities | Smooth surface, uniform color, without obvious impurities |
| Cracking property | A sample has no obvious cracks after being folded in half | A sample has no obvious cracks after being folded in half |
| Plasticity | 0.4-1.0 | 0.53-0.58, qualified |
| Density (g/cm³) | 0.25-1.8 | 1.11-1.17, qualified |
| Cold resistance (−15 ± 3)° C./4 h | After a cold resistance test, the sample returns to room temperature, and the change in its plasticity does not exceed 20% | 0.51-0.57, qualified |
| Packaging tightness | Weight loss ≤ 1% | 0.11%-0.15%, qualified |
| Mildew resistance | At (30 ± 3)° C. and relative humidity 75%, there is no mildew after 72 h of experiment | No mildew after 72 h, qualified |

The elasticity and ductility of the starch based modeling clay prepared in Example 4 were tested according to commercially available standards. The test results are shown in Table 4-2 below.

TABLE 4-2

| | Test results of elasticity and ductility of starch based modeling clay | |
|---|---|---|
| | Test result | |
| Test item | Commercially available modeling clay | Starch based modeling clay |
| Elasticity | 0.168 | 0.236 |
| Ductility (mm) | 15.75 | 17.92 |

Example 5

The only difference from Example 1 was that the cassava starch in the formula of the food grade starch based modeling clay was replaced with glutinous rice starch, and the other parameters and preparation methods were the same as those in Example 1.

The modeling clay prepared in Example 5 was tested according to the industry standards QB/T 2960-2008 of *Modeling Clay*. The test results are shown in Table 5-1 below.

TABLE 5-1

Test results of starch based modeling clay

| Test item | Technical requirement | Test result |
|---|---|---|
| Appearance | Smooth surface, uniform color, without obvious impurities | Smooth surface, uniform color, without obvious impurities |
| Cracking property | A sample has no obvious cracks after being folded in half | A sample has no obvious cracks after being folded in half |
| Plasticity | 0.4-1.0 | 0.50-0.54, qualified |
| Density (g/cm³) | 0.25-1.8 | 1.09-1.16, qualified |
| Cold resistance (−15 ± 3)° C./4 h | After a cold resistance test, the sample returns to room temperature, and the change in its plasticity does not exceed 20% | 0.50-0.54, qualified |
| Packaging tightness | Weight loss ≤ 1% | 0.10%-0.16%, qualified |
| Mildew resistance | At (30 ± 3)° C. and relative humidity 75%, there is no mildew after 72 h of experiment | No mildew after 72 h, qualified |

The elasticity and ductility of the starch based modeling clay prepared in Example 5 were tested according to commercially available standards. The test results are shown in Table 5-2 below.

TABLE 5-2

Test results of elasticity and ductility of starch based modeling clay

| Test item | Test result | |
|---|---|---|
| | Commercially available modeling clay | Starch based modeling clay |
| Elasticity | 0.168 | 0.282 |
| Ductility (mm) | 15.75 | 20.92 |

Example 6

The only difference from Example 1 was that the temperature raise in step (3) of the food grade starch based modeling clay preparation process was changed from 65° C. to 55° C., and the other parameters and preparation methods were the same as those in Example 1.

The modeling clay prepared in Example 6 was tested according to the industry standards QB/T 2960-2008 of *Modeling Clay*. The test results are shown in Table 6-1 below.

TABLE 6-1

Test results of starch based modeling clay

| Test item | Technical requirement | Test result |
|---|---|---|
| Appearance | Smooth surface, uniform color, without obvious impurities | Smooth surface, uniform color, without obvious impurities |
| Cracking property | A sample has no obvious cracks after being folded in half | A sample has no obvious cracks after being folded in half |
| Plasticity | 0.4-1.0 | 0.49-0.55, qualified |
| Density (g/cm³) | 0.25-1.8 | 1.15-1.18, qualified |
| Cold resistance (−15 ± 3)° C./4 h | After a cold resistance test, the sample returns to room temperature, and the change in its plasticity does not exceed 20% | 0.51-0.59, qualified |
| Packaging tightness | Weight loss ≤ 1% | 0.11%-0.14%, qualified |
| Mildew resistance | At (30 ± 3)° C. and relative humidity 75%, there is no mildew after 72 h of experiment | No mildew after 72 h, qualified |

The elasticity and ductility of the starch based modeling clay prepared in Example 6 were tested according to commercially available standards. The test results are shown in Table 6-2 below.

TABLE 6-2

Test results of elasticity and ductility of starch based modeling clay

| Test item | Test result | |
|---|---|---|
| | Commercially available modeling clay | Starch based modeling clay |
| Elasticity | 0.168 | 0.237 |
| Ductility (mm) | 15.75 | 18.91 |

Example 7 (Without Hydrophilic Colloid)

Provided is a preparation method of a food grade starch based modeling clay. The food grade starch based modeling clay is prepared from the following formula components:

| Component | Mass/g |
|---|---|
| Cassava starch | 160 |
| Water | 140 |
| Food grade potassium dihydrogen phosphate (stabilizer) | 10 |

-continued

| Component | Mass/g |
|---|---|
| Iodine-free edible salt | 10 |
| Sodium benzoate | 0.6 |
| Glycerin (plasticizer) | 40 |
| Food grade white oil: 3# | 8 |
| Pigment titanium dioxide | 5 |

The method includes the following steps:

(1) solid raw materials including 160 g of cassava starch, 10 g of potassium dihydrogen phosphate, 0.6 g of sodium benzoate and 10 g of iodine-free edible salt were mixed together, and a kneading mixer was adjusted to mix the raw materials evenly at a rate of 40 rpm;

(2) 90 g of an aqueous solution was added into the kneading mixer of step (1), the kneading mixer was turned on for heating to make the temperature raised to 65° C. at a rate of 3° C./min, and pre-gelatinization was carried out for 15 min to allow starch to be gelatinized and polymerized, so that a dough-like structuredd clay ball was formed;

(3) 40 g of glycerin was added to the clay ball prepared in step (2), and the mixture was continuously stirred for 10 min at a rate of 40 rpm, so as to form a plastic clay ball;

(4) 8 g of food grade white oil: 3 #was added to the clay ball prepared in step (3), and the mixture was continuously stirred for 10 min for fully and evenly kneading, so as to form shaped clay; and (5) 5 g of titanium dioxide and 50 g of water were prepared into a pigment solution, then the obtained pigment solution was added to the shaped clay prepared in step (4) and stirred for 10 min, the stirred modeling clay was poured out and allowed to stand at room temperature, and then the product was packaged after cooled.

The modeling clay prepared in Example 7 was tested according to the industry standards QB/T 2960-2008 of *Modeling Clay*. The test results are shown in Table 7-1 below.

TABLE 7-1

Test results of starch based modeling clay

| Test item | Technical requirement | Test result |
|---|---|---|
| Appearance | Smooth surface, uniform color, without obvious impurities | Smooth surface, uniform color, without obvious impurities |
| Cracking property | A sample has no obvious cracks after being folded in half | A sample has no obvious cracks after being folded in half |
| Plasticity | 0.4-1.0 | 0.50-0.54, qualified |
| Density (g/cm$^3$) | 0.25-1.8 | 1.10-1.14, qualified |
| Cold resistance (−15 ± 3)° C./4 h | After a cold resistance test, the sample returns to room temperature, and the change in its plasticity does not exceed 20% | 0.50-0.54, qualified |
| Packaging tightness | Weight loss ≤ 1% | 0.10%-0.12%, qualified |
| Mildew resistance | At (30 ± 3)° C. and relative humidity 75%, there is no mildew after 72 h of experiment | No mildew after 72 h, qualified |

The elasticity and ductility of the starch based modeling clay prepared in Example 7 were tested according to commercially available standards. The test results are shown in Table 7-2 below.

TABLE 7-2

Test results of elasticity and ductility of starch based modeling clay

| Test item | Test result | |
|---|---|---|
| | Commercially available modeling clay | Starch based modeling clay |
| Elasticity | 0.168 | 0.184 |
| Ductility (mm) | 15.75 | 17.62 |

Example 7 differs from Example 1 in that no hydrophilic colloid is added. The modeling clay product prepared in Example 7 has a smooth surface and uniform color. Its plasticity meets the standards of *Modeling Clay*, and its elasticity and ductility exceed those of commercially available modeling clay.

Comparative Example 1

Provided is a preparation method of a food grade starch based modeling clay. The starch based modeling clay is prepared from the following formula components:

| Component | Mass/g |
|---|---|
| Corn starch | 160 |
| Water | 140 |
| Food grade potassium dihydrogen phosphate (stabilizer) | 10 |
| Iodine-free edible salt | 10 |
| Sodium benzoate | 0.6 |
| Guar gum (hydrophilic colloid) | 6 |
| Glycerin (plasticizer) | 40 |
| Food grade white oil: 3# | 8 |
| Titanium dioxide | 5 |

The method specifically includes the following steps:

(1) solid raw materials including 160 g of corn starch, 10 g of potassium dihydrogen phosphate, 10 g of iodine-free edible salt and 0.6 g of sodium benzoate were added into a kneading mixer, and the kneading mixer was adjusted to mix the raw materials evenly at a rate of 40 rpm;

(2) 6 g of guar gum and 60 g of water were prepared into a hydrophilic colloid solution, and the mixture prepared in step (1) was stirred with the hydrophilic colloid solution for 2 min using a disintegrator, so that the colloid and water were enabled to form a uniform colloid solution;

(3) the colloid solution obtained in step (2) and 30 g of an aqueous solution were added into the kneading mixer, the kneading mixer was turned on for heating to make the temperature raised to 65° C. at a rate of 3° C./min, and pre-gelatinization was carried out for 15 min to allow starch to be gelatinized and polymerized, so that dough-like structured modeling clay was formed;

(4) 40 g of glycerin was added to the dough-like structured modeling clay prepared in step (3), and the mixture was continuously stirred for 10 min at a rate of 40 rpm, so as to form plastic modeling clay;

(5) 8 g of food grade white oil: 3 #was added to the modeling clay obtained in step (4), and the mixture was continuously stirred for 10 min for evenly kneading the starch based modeling clay, so as to form shaped modeling clay; and (6) 5 g of titanium dioxide and 50 g of water were prepared into a pigment solution, then the obtained pigment solution was added to the shaped modeling clay prepared in step (5) and stirred for 10 min, the stirred modeling clay was poured out and allowed to stand at room temperature, and then the product was packaged after cooled.

The modeling clay prepared in Comparative Example 1 was tested according to the industry standards QB/T 2960-2008 of *Modeling Clay*. The test results are shown in Table 8-1 below.

TABLE 8-1

Test results of starch based modeling clay

| Test item | Technical requirement | Test result |
|---|---|---|
| Appearance | Smooth surface, uniform color, without obvious impurities | Smooth surface, uniform color, without obvious impurities |
| Cracking property | A sample has no obvious cracks after being folded in half | A sample has obvious cracks after being folded in half |
| Plasticity | 0.4-1.0 | Unqualified |
| Density (g/cm$^3$) | 0.25-1.8 | 0.74-0.90, qualified |
| Cold resistance (−15 ± 3)° C./4 h | After a cold resistance test, the sample returns to room temperature, and the change in its plasticity does not exceed 20% | Unqualified |
| Packaging tightness | Weight loss ≤1% | 0.12%-0.16%, qualified |
| Mildew resistance | At (30 ± 3)° C. and relative humidity 75%, there is no mildew after 72 h of experiment | No mildew after 72 h, qualified |

The elasticity of the starch based modeling clay prepared in Comparative Example 1 was tested according to commercially available standards. The test results are shown in Table 8-2 below.

TABLE 8-2

Test results of elasticity and ductility of starch based modeling clay

| | Test result | |
|---|---|---|
| Test item | Commercially available modeling clay | Starch based modeling clay |
| Elasticity | 0.168 | 0.087 |
| Ductility (mm) | 15.75 | 7.10 |

The product obtained in Comparative Example 1 has uniform appearance and color, but is poor in internal bonding force. Its elasticity and plasticity cannot meet the performance standards of modeling clay.

Comparative Example 2

The only difference from Example 1 was that the cassava starch in the formula of the food grade starch based modeling clay was replaced with potato starch, and the other parameters and preparation methods were the same as those in Example 1.

The modeling clay prepared in Comparative Example 2 was tested according to the industry standards QB/T 2960-2008 of *Modeling Clay*. The test results are shown in Table 9-1 below.

TABLE 9-1

Test results of starch based modeling clay

| Test item | Technical requirement | Test result |
|---|---|---|
| Appearance | Smooth surface, uniform color, without obvious impurities | Smooth surface, uniform color, without obvious impurities |
| Cracking property | A sample has no obvious cracks after being folded in half | A sample has obvious cracks after being folded in half |
| Plasticity | 0.4-1.0 | Unqualified |
| Density (g/cm$^3$) | 0.25-1.8 | Unqualified |

TABLE 9-1-continued

Test results of starch based modeling clay

| Test item | Technical requirement | Test result |
|---|---|---|
| Cold resistance (−15 ± 3)° C./4 h | After a cold resistance test, the sample returns to room temperature, and the change in its plasticity does not exceed 20% | Unqualified |
| Packaging tightness | Weight loss ≤1% | Unqualified |
| Mildew resistance | At (30 ± 3)° C. and relative humidity 75%, there is no mildew after 72 h of experiment | No mildew after 72 h, qualified |

The elasticity of the starch based modeling clay prepared in Comparative Example 2 was tested according to commercially available standards. The test results are shown in Table 9-2 below.

TABLE 9-2

Test results of elasticity and ductility of starch based modeling clay

| | Test result | |
|---|---|---|
| Test item | Commercially available modeling clay | Starch based modeling clay |
| Elasticity | 0.168 | 0.087 |
| Ductility (mm) | 15.75 | None |

The product obtained in Comparative Example 2 has uniform appearance and color, but is poor in internal bonding force. Its elasticity and plasticity cannot meet the performance standards of modeling clay.

From the results of Example 1 and Comparative Examples 1 and 2, it can be seen that the starch based modeling clay prepared from different types of starch can meet different modeling clay standards. Some starch can be prepared into starch based modeling clay through heat treatment to meet the industry standards and its elasticity higher than that of commercially available modeling clay. However, the modeling clay prepared by some starch is poor in viscoelasticity and thus cannot meet the standards of modeling clay at all.

Comparative Example 3

The only difference from Example 1 was that the temperature raise in step (3) of the food grade starch based modeling clay preparation process was changed from 65° C. to 45° C., and the other parameters and preparation methods were the same as those in Example 1.

The modeling clay prepared in Comparative Example 3 was tested according to the industry standards QB/T 2960-2008 of *Modeling Clay*. The test results are shown in Table 10-1 below.

TABLE 10-1

Test results of starch based modeling clay

| Test item | Technical requirement | Test result |
|---|---|---|
| Appearance | Smooth surface, uniform color, without obvious impurities | Smooth surface, uniform color, without obvious impurities |

TABLE 10-1-continued

Test results of starch based modeling clay

| Test item | Technical requirement | Test result |
|---|---|---|
| Cracking property | A sample has no obvious cracks after being folded in half | A sample has obvious cracks after being folded in half |
| Plasticity | 0.4-1.0 | Unqualified |
| Density (g/cm³) | 0.25-1.8 | 1.09-1.13, qualified |
| Cold resistance (−15 ± 3)° C./4 h | After a cold resistance test, the sample returns to room temperature, and the change in its plasticity does not exceed 20% | Unqualified |
| Packaging tightness | Weight loss ≤1% | 0.10%-0.12%, qualified |
| Mildew resistance | At (30 ± 3)° C. and relative humidity 75%, there is no mildew after 72 h of experiment | No mildew after 72 h, qualified |

The elasticity of the starch based modeling clay prepared in Comparative Example 3 was tested according to commercially available standards. The test results are shown in Table 10-2 below.

TABLE 10-2

Test results of elasticity and ductility of starch based modeling clay

| | Test result | |
|---|---|---|
| Test item | Commercially available modeling clay | Starch based modeling clay |
| Elasticity | 0.168 | 0.117 |
| Ductility (mm) | 15.75 | 6.74 |

The product obtained in Comparative Example 3 has a rough appearance and non-uniform color, and is poor in cohesive force. The product is prone to cracking and hardening.

Comparative Example 4

The only difference from Example 1 was that the temperature raise in step (3) of the food grade starch based modeling clay preparation process was changed from 65° C. to 85° C., and the other parameters and preparation methods were the same as those in Example 1.

The modeling clay prepared in Comparative Example 4 was tested according to the industry standards QB/T 2960-2008 of *Modeling Clay*. The test results are shown in Table 11-1 below.

TABLE 11-1

Test results of starch based modeling clay

| Test item | Technical requirement | Test result |
|---|---|---|
| Appearance | Smooth surface, uniform color, without obvious impurities | Smooth surface, uniform color, without obvious impurities |
| Cracking property | A sample has no obvious cracks after being folded in half | A sample has obvious cracks after being folded in half |
| Plasticity | 0.4-1.0 | Unqualified |
| Density (g/cm³) | 0.25-1.8 | 1.29-1.31, qualified |

TABLE 11-1-continued

Test results of starch based modeling clay

| Test item | Technical requirement | Test result |
|---|---|---|
| Cold resistance (−15 ± 3)° C./4 h | After a cold resistance test, the sample returns to room temperature, and the change in its plasticity does not exceed 20% | Unqualified |
| Packaging tightness | Weight loss ≤1% | Unqualified |
| Mildew resistance | At (30 ± 3)° C. and relative humidity 75%, there is no mildew after 72 h of experiment | No mildew after 72 h, qualified |

The elasticity of the starch based modeling clay prepared in Comparative Example 4 was tested according to commercially available standards. The test results are shown in Table 11-2 below.

TABLE 11-2

Test results of elasticity and ductility of starch based modeling clay

| | Test result | |
|---|---|---|
| Test item | Commercially available modeling clay | Starch based modeling clay |
| Elasticity | 0.168 | 0.157 |
| Ductility (mm) | 15.75 | 4.91 |

The product obtained in Comparative Example 4 has a smooth appearance, but it severely agglomerates. Furthermore, the starch reacts at high temperature, resulting in gelation; and therefore, the product is poor in adhesion and cannot be shaped.

From the results of Example 1 and Comparative Examples 3 and 4, it can be seen that the degree of starch gelatinization has a significant impact on the elasticity and ductility of the modeling clay during the preparation process. For the same type of starch, when subjected to heat treatment at 45° C. or 85° C., the resulting modeling clay is poor in viscoelasticity and cannot meet the standards of modeling clay at all. Only when the temperature is controlled within the range of 55-65° C., the degree of starch gelatinization can make the prepared modeling clay meet the standards, and the elasticity and ductility of the modeling clay are significantly higher than those of commercially available modeling clay.

Comparative Example 5

Provided is a preparation method of a food grade starch based modeling clay. The starch based modeling clay is prepared from the following formula components:

| Component | Mass/g |
|---|---|
| Cassava starch | 160 |
| Water | 140 |
| Food grade potassium dihydrogen phosphate (stabilizer) | 10 |
| Iodine-free edible salt | 10 |
| Sodium benzoate | 0.6 |
| Guar gum (hydrophilic colloid) | 6 |

-continued

| Component | Mass/g |
|---|---|
| Glycerin (plasticizer) | 40 |
| Food grade white oil: 3# | 8 |
| Titanium dioxide | 5 |

The method specifically includes the following steps:
(1) cassava starch was sterilized by irradiation with β-rays at a radiation dosage of 2-5 KGy;
(2) water in a mixing tank was heated up to 65° C., and then food grade potassium dihydrogen phosphate was dissolved in the water for later use;
(3) the remaining raw materials were added into the mixing tank of step (2), stirred continuously and kneaded evenly;
(4) the stirred modeling clay was poured out and placed at room temperature for 48 h; and
(5) the modeling clay was placed in a molding device and encapsulated to obtain the starch based modeling clay.

The modeling clay prepared in Comparative Example 5 was tested according to the industry standards QB/T 2960-2008 of *Modeling Clay*. The test results are shown in Table 12-1 below.

TABLE 12-1

Test results of starch based modeling clay

| Test item | Technical requirement | Test result |
|---|---|---|
| Appearance | Smooth surface, uniform color, without obvious impurities | Smooth surface, uniform color, without obvious impurities |
| Cracking property | A sample has no obvious cracks after being folded in half | A sample has obvious cracks after being folded in half |
| Plasticity | 0.4-1.0 | Unqualified |
| Density (g/cm³) | 0.25-1.8 | 1.29-1.31, qualified |
| Cold resistance (−15 ± 3)° C./4 h | After a cold resistance test, the sample returns to room temperature, and the change in its plasticity does not exceed 20% | Unqualified |
| Packaging tightness | Weight loss ≤1% | 0.10%-0.12%, qualified |
| Mildew resistance | At (30 ± 3)° C. and relative humidity 75%, there is no mildew after 72 h of experiment | No mildew after 72 h, qualified |

The elasticity of the starch based modeling clay prepared in Comparative Example 5 was tested according to commercially available standards. The test results are shown in Table 12-2 below.

TABLE 12-2

Test results of elasticity and ductility of starch based modeling clay

| | Test result | |
|---|---|---|
| Test item | Commercially available modeling clay | Starch based modeling clay |
| Elasticity | 0.168 | 0.125 |
| Ductility (mm) | 15.75 | 10.14 |

The difference between Comparative Example 5 and Example 1 lines in the different preparation processes. The starch based modeling clay prepared in Comparative Example 5 is smooth in surface, but is poor in the internal bonding force, and the starch is not well bonded to the other components. In terms of performance, there are problems such as poor plasticity and easy cracking when getting dry.

The preferred examples of the present disclosure disclosed above are merely to aid in the illustration of the present disclosure. The preferred examples are not exhaustive in all details, nor are they intended to limit the present disclosure to only the specific embodiments described. Obviously, many modifications and variations are possible in light of the contents of this description. These examples are selected and described in detail in this description to better explain the principles and practical applications of the present disclosure, so that those skilled in the art can well understand and utilize the present disclosure. The present disclosure is to be limited only by the Claims and their full scope and equivalents.

What is claimed is:

1. A method of preparing a food grade starch based modeling clay with high elasticity and high ductility, which comprises:

(a) providing the following components in parts by mass:

| | |
   |---|---|
   | (i) starch: | 160 to 180 parts, |
   | (ii) water: | 140 to 160 parts, |
   | (iii) food grade stabilizer: | 10 to 15 parts, |
   | (iv) edible salt: | 10 to 15 parts, |
   | (v) preservative: | 0.6 to 0.8 parts, |
   | (vi) hydrophilic colloid: | 0 to 10 parts, |
   | (vii) food grade plasticizer: | 40 to 60 parts, |
   | (viii) edible pigment: | 6 to 10 parts, and |
   | (ix) food grade white oil: | 4 to 8 parts, | wherein the starch comprises one or more of: cassava starch, wheat starch, and glutinous rice starch;

(b) adding the components of (a) into a kneading mixer and mixing the components evenly, so as to form a kneading mixture;

(c) combining the hydrophilic colloid and the water to form a hydrophilic colloid solution and stirring the hydrophilic colloid with a disintegrator to form a colloid solution;

(d) adding the colloid solution into the kneading mixer, turning on the kneading mixer for heating and pre-gelatinization for 15 to 25 minutes at a temperature of 55° C. to 65° C., so as to form a dough-like structured clay ball;

(e) adding the food grade plasticizer to the dough-like structured clay ball and stirring well to form a clay ball with plasticity;

(f) adding the food grade white oil to the clay ball with plasticity, stirring continuously and kneading evenly to form a shaped clay ball;

(g) preparing the food grade pigment and water into a pigment solution, and (h) adding the pigment solution to the shaped clay ball, stirring well, pouring a product out, and allowing the product to stand at room temperature, and then packaging the product after cooling.

2. The preparation method according to claim 1, wherein in step (d), the temperature at which pre-gelatinization is carried out is raised to 55° C. to 65° C. at a rate of 2° C. to 5° C. per minute.

* * * * *